(12) United States Patent
Slavik et al.

(10) Patent No.: US 9,941,956 B2
(45) Date of Patent: Apr. 10, 2018

(54) MODULAR KIT OF A DEVICE FOR MONITORING THE SPECTRAL OFFSET OF TWO CHANNELS IN NETWORKS WITH OPTICAL WAVE MULTIPLEXES

(71) Applicant: Cesnet, zájmové sdruzeni právanických osob, Prague (CZ)

(72) Inventors: Radan Slavik, Southampton (GB); Josef Vojtech, Prague (CZ); Vladimir Smotlacha, Prague (CZ); Jan Radil, Prague (CZ)

(73) Assignee: Cesnet, zajmove sdruzeni pravnickych osob, Prague (CZ)

( * ) Notice: Subject to any disclaimer, the term of this patent is extended or adjusted under 35 U.S.C. 154(b) by 0 days.

(21) Appl. No.: 15/185,263

(22) Filed: Jun. 17, 2016

(65) Prior Publication Data
US 2017/0093485 A1 Mar. 30, 2017

(30) Foreign Application Priority Data
Jun. 18, 2015 (CZ) .............................. PV 2015-409

(51) Int. Cl.
*H04B 10/08* (2006.01)
*H04B 10/071* (2013.01)
*G01J 3/51* (2006.01)
*H04B 10/079* (2013.01)

(52) U.S. Cl.
CPC .............. *H04B 10/071* (2013.01); *G01J 3/51* (2013.01); *H04B 10/07957* (2013.01)

(58) Field of Classification Search
CPC ................................................ H04B 10/07957
See application file for complete search history.

(56) References Cited

U.S. PATENT DOCUMENTS

| | | | | |
|---|---|---|---|---|
| 6,067,187 A | * | 5/2000 | Onaka | H01S 3/06754 359/337 |
| 6,697,575 B1 | * | 2/2004 | Liang | H04B 10/2972 398/104 |
| 7,133,610 B1 | * | 11/2006 | Shimura | H04B 10/50575 398/15 |
| 9,654,215 B2 | * | 5/2017 | Vojtěch | H04B 10/2503 |
| 2003/0123782 A1 | * | 7/2003 | Miyata | G02F 1/0121 385/15 |

(Continued)

FOREIGN PATENT DOCUMENTS

WO 03055107 A3 4/2004

*Primary Examiner* — Ken N Vanderpuye
*Assistant Examiner* — Jai Lee
(74) *Attorney, Agent, or Firm* — Buchanan Ingersoll & Rooney PC

(57) ABSTRACT

A first photodetector is interconnected with a control unit equipped with a communication interface and powered by a power supply module. An output of a first optical filter is connected to an input of a first photodetector via a second optical filter, while a second output of the second optical filter is connected to an input of a second photodetector. An output of the second photodetector is connected to a control unit. A split branch of a third directional coupler is connected to the input of a third photodetector, the output of which is connected to the control unit. A split branch of a fourth directional coupler is connected to the input of a fourth photodetector, the output of which is connected to the control unit.

6 Claims, 1 Drawing Sheet

(56) References Cited

U.S. PATENT DOCUMENTS

| | | | |
|---|---|---|---|
| 2003/0231889 A1* | 12/2003 | Brown | H04B 10/505 |
| | | | 398/186 |
| 2004/0114149 A1* | 6/2004 | Einstein | G01J 9/04 |
| | | | 356/484 |
| 2014/0376909 A1* | 12/2014 | Frisken | H04J 14/0227 |
| | | | 398/26 |
| 2016/0329964 A1* | 11/2016 | Vojtech | H04B 10/2914 |

* cited by examiner

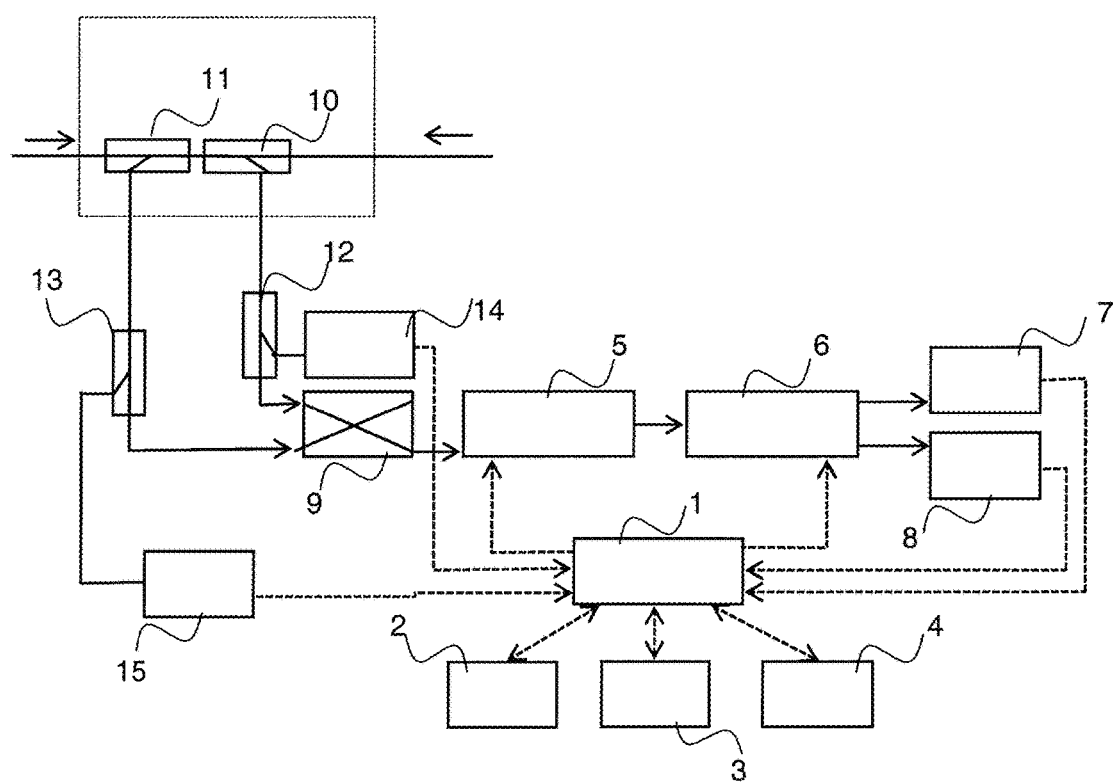

MODULAR KIT OF A DEVICE FOR MONITORING THE SPECTRAL OFFSET OF TWO CHANNELS IN NETWORKS WITH OPTICAL WAVE MULTIPLEXES

BACKGROUND OF THE INVENTION

The technical solution deals with a modular kit of a device for monitoring the spectral offset of two channels with different wavelengths allowing to measure changes of the times the signals travel in the transmission system, for example in networks with optical waves multiplexes; the solution is based on low-cost components with no mechanically demanding parts, it is usable for a wide spectrum of wavelengths, and it addresses the sphere of telecommunication technologies and services.

DESCRIPTION OF PRIOR ART

At present, the spectral offset of channels in networks with wave multiplexes is monitored by various devices and methods, such as optical spectrum analyzers, wavemeters or comparisons with a comb normal. These devices or methods as a whole, however, are relatively complex and, most of all, they are costly, or possibly their accuracy is low.

Optical spectrum analyzers exploit reflective or refractive techniques to split the incoming light into beams of certain spectrum range and subsequently they use an electrical-optical detector, typically a photodiode, which measures its intensity. There are various principles, for instance those using monochromator, or more precise methods using Fabry-Pérot interferometer. Typically, the width of measured range reaches 30-60 pm. The spectrum range is usually limited to approximately 400 nm to 1700 nm, depending on the spectrum analyzer type and given manufacturer. Also, there are spectrum analyzers using fast Fourier transformation (FFT) where the input signal is sampled and subsequently, using the FFT, the spectrum is determined. This method is more accurate but it is slow and imposes high demands on the analogue-to-digital converters.

Wavemeters exploit the principle of an interferometer and they can be divided into static ones without any moving parts and scanning ones. Scanning wavemeter is based on the known Michelson interferometer where one arm of the interferometer is movable and the optical power impacting the detector is evaluated. This method is encumbered with several kinds of errors, such as temperature-induced change of physical length. Static wavemeters use Fizeau interferometer and most commonly they use two fixed little mirrors while the principle is based on their surfaces being not perfectly parallel.

The method using a frequency comb is very accurate but also the most expensive one. The comb itself generates radiation in the series of discrete parts featuring very precise and constant frequency intervals. Basic principles include the amplitude modulation of continuous laser and stabilization of burst pulses of so-called "mode-lock" laser. The potential of the combs is high; at present, however, there are no exact methods for their design and modeling, and it is not possible to determine and build a system with precisely defined parameters and predictable and repeatable behavior of such comb system.

Solutions mentioned for instance in the document US 2014/0376909 Frisken et al., using a cascade of two filters serve a different purpose and use a different architecture. The system works with slow-frequency modulated signals, it involves tens of kHz and performs demodulation of information coded in this way at the edge of the filter. The described solution is usable for signals modulated in any way and it is neutral to the modulated information. This device further implements the first and the second filter, which are tunable and technologically very demanding and expensive. These technologies include for instance micro electro-mechanical mirror, scanning Fabry-Pérot etalon, coherent receiver with local oscillator. These filters contain costly and mechanically sensitive components. The solution exploits tuning of the second filter into and outside the transmission characteristics of the first filter to determine the optical signal-to-noise ratio, see formula at [00731] of this patent publication.

Another known solution according to WO 03055107 Margalit is designed to determine the power in an optical channel, central frequency in the channel, optical signal-to-noise ratio, eye diagram in the channel, et cetera, but not to determine the spectrum offset of two channels. The solution proposes to use a pair of filters in parallel as a discriminator, while the filters with identical spectral characteristics are slightly detuned by a value lower than the width of the filters bandwidth. The solution exploits the architecture where the input signal is split by a common splitter of the optical power into N parts and subsequently it is processed in N explicitly tunable filters.

SUMMARY OF THE INVENTION

Disadvantages mentioned above are solved by a modular kit of a device for monitoring the spectral offset of two channels with different wavelengths allowing to measure changes of the times the signals travel in the transmission system, for example temperature-induced changes, in networks with optical wave multiplexes according to the presented solution. The kit contains the first and the second directional couplers, which are connected via an optical coupling element and the first optical filter with the first photodetector. The first photodetector is interconnected with the control unit equipped with wired and/or wireless communication interface and powered by the power supply module. The principle of the new solution is that the output of the first optical filter is connected to the input of the first photodetector via the second optical filter, while the second output of the second optical filter is connected to the input of the second photodetector. The output of the second photodetector is connected to the control unit. The third directional coupler, oriented identically with the first directional coupler, is connected between the output of the first directional coupler and the first input of the coupling element. The split branch of the third directional coupler is connected to the input of the third photodetector, the output of which is connected to the control unit. Simultaneously, the fourth directional coupler, oriented identically with the second directional coupler, is connected between the output of the second directional coupler and the second input of the coupling element. The split branch of the fourth directional coupler is connected to the input of the fourth photodetector, the output of which is connected to the control unit.

The first optical filter is a band-pass filter with wide bandwidth and it features characteristics such that both monitored signals are spectrally located one on its leading edge or falling edge and the other also on its leading edge or falling edge. The second optical filter is a three-gate filter. Its one output corresponds to the band-pass function, while its central wavelength corresponds to the wavelength of the first monitored signal and the second output corresponds to the band-stop function and therefore the remaining optical spectrum is directed to it.

In one possible embodiment the first filter or both the first and the second optical filters together are filters featuring periodic spectral characteristics.

In a preferred embodiment the control unit, including the module of the wired and wireless communication interfaces, is formed by a single-board industrial computer without moving parts.

Preferably, the power supply module is designed as redundant.

In another possible embodiment the first and the second directional couplers are inserted directly into the directionally corresponding fibers of the measured line.

The advantage of the described arrangement of a modular kit for monitoring the offset of channels in networks with optical wave multiplexes is that it contains only non-expensive optical components, it means couplers, fixed filters, and slow detectors, which moreover allow easy integration. As opposed to the solution in WO 03055107, in the presented solution the monitored channels are merged at the processing start point, not split. Implemented components are commercially available from many manufacturers and despite their low purchase costs they comply with high demands common for telecommunication components. Therefore, the device requires no mechanically sensitive components and features resistance against vibrations, dust, etc. The device further contains no expensive high-frequency electrical circuits and it does not generate any electromagnetic compatibility issues. The device also allows to monitor signals in wide spectrum range from 400 to 2300 nm. The presented solution exploits no tunable filters and it monitors the spectral offset of two signals at the input.

EXPLANATION OF DRAWINGS

The principle of the presented solution is explained below and described by means of the attached drawing, which shows a block diagram of the device in its fullest configuration. In the attached drawing, full lines indicate optical connections and dashed lines indicate electrical connections.

DETAILED DESCRIPTION OF THE PREFERRED EMBODIMENTS

The connection of the modular kit of a device for monitoring the spectral offset of two channels in networks with optical wave multiplexes is shown in the attached drawing in the form of a block diagram. The device, as shown in the drawing, is designed to monitor the spectral offset of two signals traveling on their wavelengths in opposite directions via the same fiber. This, in fact, allows to determine the time the signals travel in the optical fiber with high accuracy and therefore also to precisely synchronize both signals. The device may be used for time transmission with high precision. The device consists of the first directional coupler 10, which splits the upstream signal and it is connected via the directionally identical third directional coupler 12 to one input of the coupling element 9. Split branch of the third directional coupler 12 is connected to the input of the third photodetector 14. Analogically, the device has the second directional coupler 11, which splits the downstream signal and it is connected via the directionally identical fourth directional coupler 13 to the second input of the coupling element 9. Split branch of the fourth directional coupler 13 is connected to the input of the fourth photodetector 15. The output of the third photodetector 14 and output of the fourth photodetector 5 are interconnected with the control unit 1, which is powered by the power supply module 4 and it is equipped with wired communication interface 2 and wireless communication interface 3. The output of the coupling element 9 is via the first optical filter 5 connected to the input of the second optical filter 6.

The kit itself is formed by the optical part interconnected with the electronic part. The basic principle is that it contains a cascade of the first optical filter 5 and the second optical filter 6 where both filters are common telecommunication filters with relatively wide bandwidths, for instance the first optical filter 5 bandwidth is 1.6 nm and the second optical filter 6 bandwidth is 0.8 nm, or the first optical filter 5 bandwidth is 0.8 nm and the second optical filter 6 bandwidth is 0.4 nm. Transmission characteristics of the first optical filter 5 are such that one of the monitored signals is spectrally located on the leading edge or the falling edge of the filter and the other signal is also spectrally located on the leading edge or the falling edge of the characteristics of this filter. All four combinations are permissible: the first signal on the leading edge and the second signal on the falling edge; the first signal on the falling edge and the second signal on the leading edge; both signals on the leading edge; or both signals on the falling edge. It is advantageous to use as the first optical filter 5, or as both the first optical filter 5 together with the second optical filter 6, the filters with periodic characteristics, which therefore will be suitable for the whole group of wavelengths. If the first optical filter 5 is a filter with periodic characteristics, then by changing the second optical filter 6 the pair of channels to be monitored can be easily changed also. In order to keep the device independent on wavelength it is necessary that the second optical filter 6 be also a filter with periodic characteristics. The second optical filter 6 is a filter of so-called three-gate type, which has two optical outputs. The first output corresponds to the wavelength of the first monitored signal and to the second output the rest of the optical spectrum is directed, it means the second signal. The connection may also be realized vice versa when the second output of the second optical filter 6 corresponds to the wavelength of the second monitored signal and the remaining optical spectrum, it means the first signal, is directed to the first output. To one output of the second optical filter 6 is connected the input of the first photodetector 7 and to the second output of the second optical filter 6 is connected the input of the second photodetector 8. Outputs of the first photodetector 7 and the second photodetector 8 are interconnected with the control unit 1.

The signals are branched from the transmission line by the first directional coupler 10 and the second directional coupler 11, which however may be installed directly in the fibers of the monitored line. Branched signals then pass through the next pair of directional couplers, it means the third directional coupler 12 and the fourth directional coupler 13, where small parts of the signals are branched to monitor their powers. These small parts are detected by the next pair of photodetectors, it means the third photodetector 14 and the fourth photodetector 15. The signals as such are merged at the coupling element 9 and brought to the input of the first optical filter 5. Due to the above-described placement of the signals at the edges of the first optical filter 5 the signals are attenuated with respect to their spectral placement. The second optical filter 6 of the cascade separates both monitored signals from each other and they are led from its outputs: the first signal to the first photodetector 7 and the second signal to the second photodetector 8 where the signals are detected.

The control unit 1 is powered by the power supply module 4, which in one possible preferred embodiment is designed as redundant. The control unit 1 is equipped with the wired communication interface module 2 and/or with the wireless communication interface module 3. As mentioned above, the control unit 1 can be advantageously formed by a single-board industrial computer without moving parts. The wired communication interface module 2 and/or the wireless communication interface module 3 may also be integrated into the control unit 1.

The control unit 1 contains a software measuring the optical powers at the individual photodetectors 7, 8, 14 and 15. The software determines the offset of the monitored channels as follows: the third photodetector 14 determines the input power of the first signal. If this power is constant but the power detected by the first photodetector 7 fluctuates, then the wavelength of the first signal is changing. The same applies for the fourth photodetector 15 and the second photodetector 8 and the second signal. Based on the known characteristics of the first optical filter 5 and the ratio of the optical powers measured at the third photodetector 14 and the first photodetector 7 the software of the control unit 1 determines the wavelength of the first signal and based on the ratio of the optical powers at the fourth photodetector 15 and the second photodetector 8 it determines the wavelength of the second signal, and finally the software evaluates the mutual offset of the first and second signals wavelengths. The advantage of this solution is the fact that even if the first optical filter 5 would slightly change the central wavelength, for example due to changes in the ambient temperature, the shape of the filtering characteristics remains unchanged, and the first optical filter 5 needs no temperature stabilization. The control unit 1 software provides information about powers and changes of wavelengths via the wired communication interface 2 and/or the wireless communication interface 3 to the supervising system.

INDUSTRIAL APPLICABILITY

This technical solution finds its industrial applicability especially in the sphere of monitoring of the channels offset in optical networks, including networks with wave multiplexes for transmission of time with high accuracy. Due to chromatic dispersion of optical fiber the time of a signal spreading depends on its wavelength. If the difference of wavelengths of signals spreading from the opposite directions is monitored, it is possible to determine also the changes of times of the signals spreading in both directions. Unlike the known solutions, this device contains no expensive components operating at high frequencies or sensitive to shocks, temperature changes, vibrations or dusty environment. This technical solution provides also remote supervision including monitoring of the processed optical signals. In contrary to known solutions, this solution is based on commonly available components.

CONCLUSION

Modular kit of a device contains the first and the second directional couplers (10, 11), which serve for extraction of two signals traveling in the opposite directions of the optical fiber and are interconnected via the optical coupling element (9) and the first optical filter (5) with the first photodetector (7), which is interconnected with the control unit (1) equipped with the wired communication interface (2) and/or the wireless communication interface (3), and powered by the power supply module (4). The output of the first optical filter (5) is connected to the input of the first photodetector (7) via the second optical filter (6), while the second output of the second optical filter (6) is connected to the input of the second photodetector (8). The output of the second photodetector (8) is interconnected with the control unit (1). Between the output of the first directional coupler (10) and the first input of the coupling element (9) is connected the third directional coupler (12) oriented identically as the first directional coupler (10), while its split branch is interconnected with the input of the third photodetector (14), the output of which is connected to the control unit (1). Between the output of the second directional coupler (11) and the second input of the coupling element (9) is connected the fourth directional coupler (13) oriented identically as the second directional coupler (11), while its split branch is interconnected with the input of the fourth photodetector (15), the output of which is connected to the control unit (1). The first optical filter (5) is a band-pass filter with wide bandwidth and its characteristics are such that the monitored signals are spectrally located at its leading or falling edge. The second optical filter (6) is a three-gate-type filter, where its one output corresponds to the band-pass function with the central wavelength corresponding to the wavelength of the first monitored signal, and its second output corresponds to the band-stop function and therefore the remaining optical spectrum is directed to it.

The invention claimed is:

1. Modular kit of a device for monitoring a spectral offset of two channels in networks with optical wave multiplexers where signals travel in opposite directions at different wavelengths containing a first optical directional coupler, a second optical directional coupler connected to a first photodetector via an optical coupling element and a first optical filter, where the first photodetector is interconnected with a control unit equipped with a wired communication interface and/or wireless communication interface and powered by a power supply module characterized by a fact that the output of the first optical filter is connected to an input of the first photodetector via a second optical filter, while a second output of the second optical filter is connected to an input of the second photodetector, where an output of the second photodetector is interconnected with the control unit, and further, between the output of the first directional coupler and an input of the coupling element is connected a third directional coupler, oriented identically as the first directional coupler, while its split branch is interconnected with an output of a third photodetector, the output of which is connected to the control unit, and simultaneously between the output of the second directional coupler and the second input of the coupling element is connected a fourth directional coupler, oriented identically as the second directional coupler, while its split branch is interconnected with an output of a fourth photodetector, the output of which is connected to the control unit, while the first optical filter is a band-pass filter with wide bandwidth and features such characteristics that monitored signals are spectrally located with a first monitored signal on its leading or falling edge and a second monitored signal also on its leading or falling edge, and the second optical filter is a three-gate-type filter, where its one output corresponds to a band-pass function with a central frequency corresponding to a wavelength of the first monitored signal and the second output corresponds to a band-stop function and therefore a remaining optical spectrum is directed to it.

2. Modular kit according to claim 1, whereby the first optical filter is a filter featuring periodic spectral characteristics.

3. Modular kit according to claim 2, whereby the second optical filter is a filter featuring periodic spectral characteristics.

4. Modular kit according to claim 1, whereby the control unit, including the wired communication interface module and the wireless communication interface module, is formed by a single-board industrial computer without moving parts.

5. Modular kit according to claim 1, whereby the power supply module is designed as redundant.

6. Modular kit according to claim 1, whereby the first directional coupler and the second directional coupler are inserted directly in the fiber of the monitored line.

* * * * *